Figure 1:
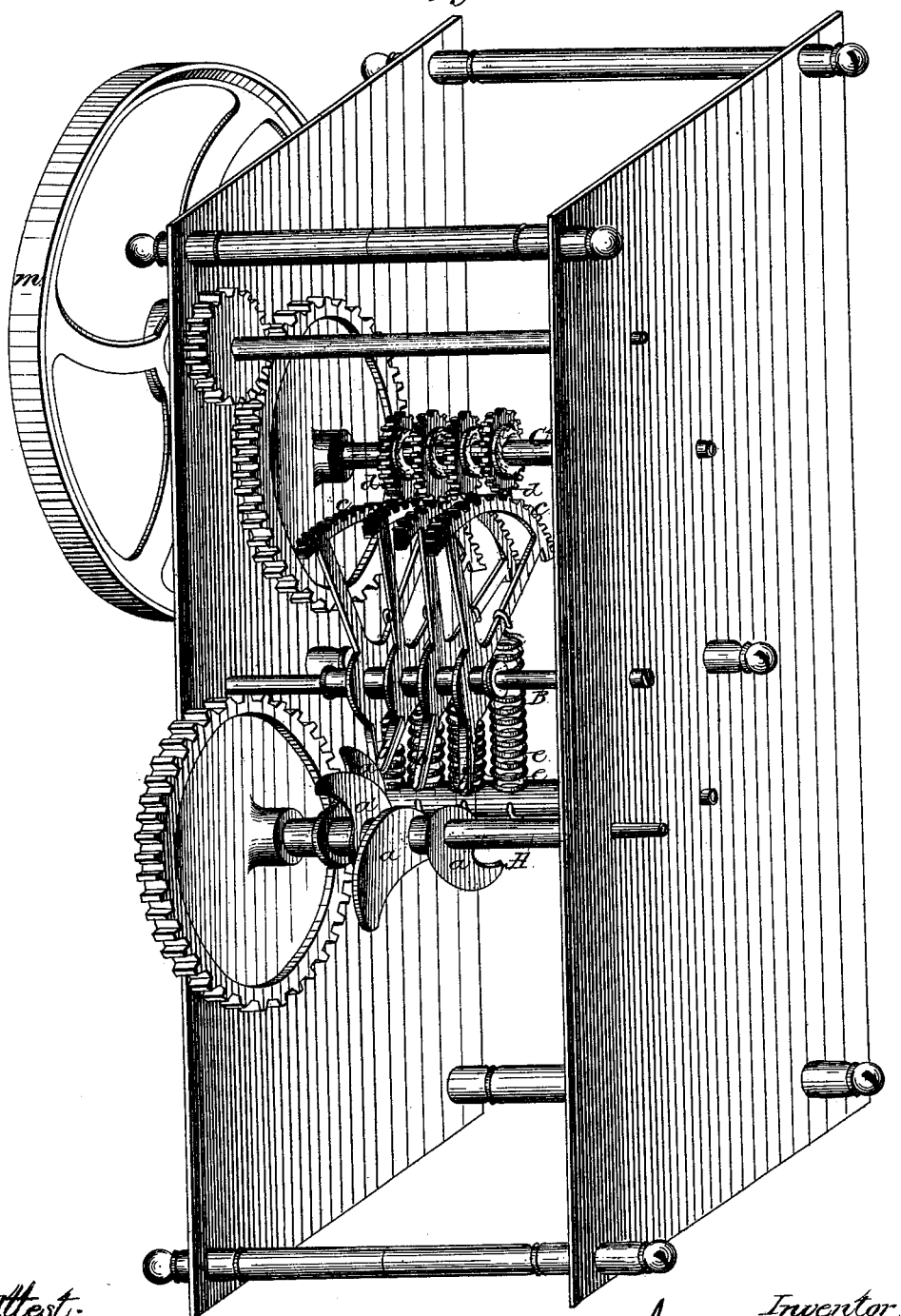

W. K. AZBILL.
Motor.

No. 202,626. Patented April 23, 1878.

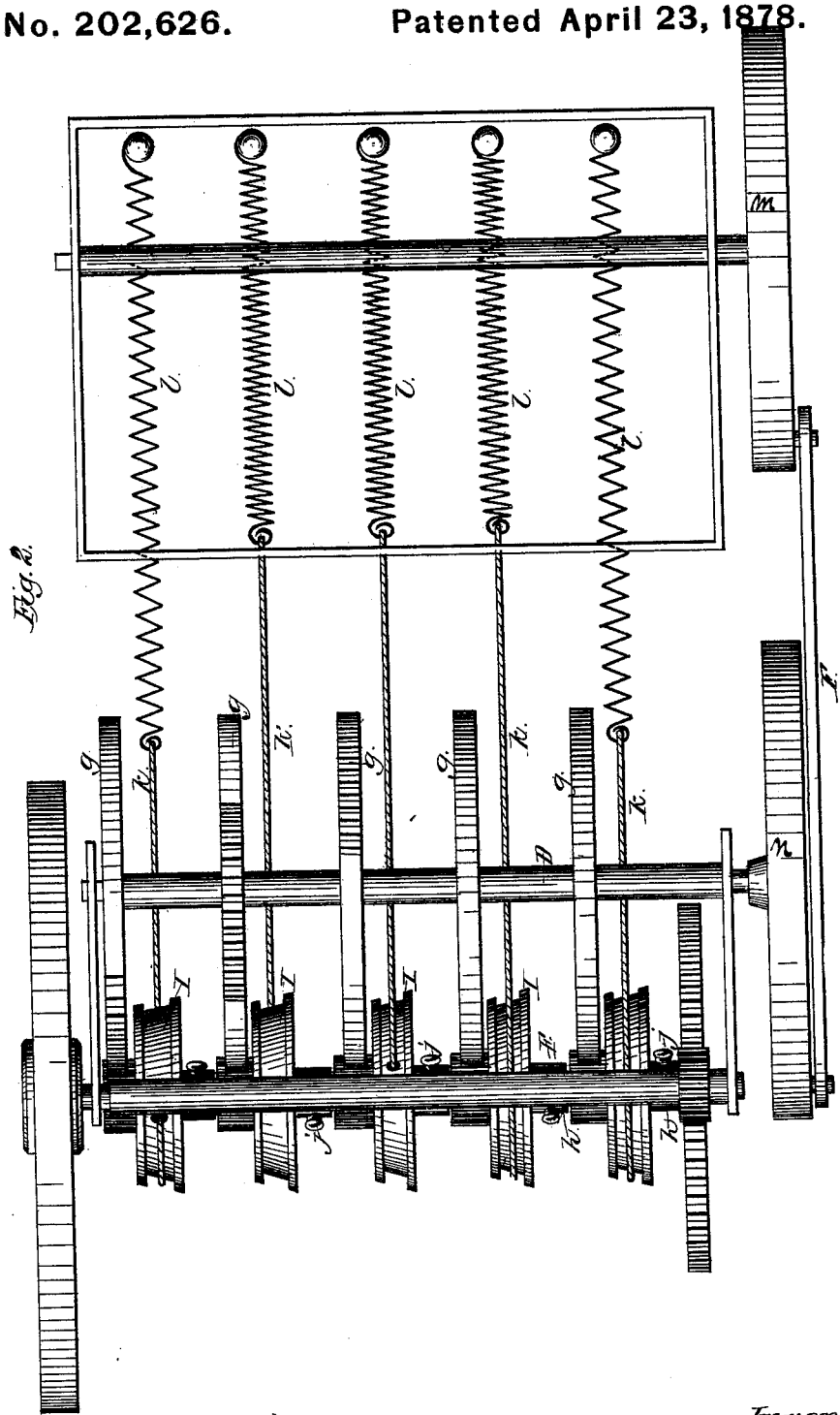
W. K. AZBILL.
Motor.
No. 202,626. Patented April 23, 1878.
2 Sheets—Sheet 2.
Attest:
D. P. Cowl
Levi Bacon
Inventor:
W. K. Azbill.

UNITED STATES PATENT OFFICE.

WILSON K. AZBILL, OF COLUMBIA, KENTUCKY.

IMPROVEMENT IN MOTORS.

Specification forming part of Letters Patent No. 202,626, dated April 23, 1878; application filed April 1, 1878.

*To all whom it may concern:*

Be it known that I, W. K. AZBILL, of Columbia, in the county of Adair and State of Kentucky, have invented a new and useful Mechanical Motor, actuated by springs, with the use of a series of levers and gearing in combination, of which the following is a specification:

The invention relates to the accumulation of power in a motor by the joint or united force of a series of springs, which, with the use of levers, cogs, ratchets, and gearing, are reduced one by one, or part by part, successively.

The object of the invention is to provide a system of levers, springs, and gearing, by means of which an apparatus of a given power may operate another like apparatus of greater power; to arrange and combine such apparatus in a series for the accumulation of any desired power in a motor; to render a motor thus constructed automatic in its operations, and to supply a cheap motor that may be used wherever motor force is needed.

In the accompanying drawing, Figure 1 represents one part of the machine in detail, and Fig. 2 represents a second part in detail, and also the combination with the first.

In Fig. 1, A represents a shaft having cams $a$ arranged spirally around and upon it. B represents a shaft that serves as a fulcrum for the levers $b$, having the segmental cog-wheels $c$, gearing in the pinions $d$, and being actuated by the springs $e$. C represents a shaft having the pinions $d$ and ratchets $f$, by which the force of the springs $e$ is secured to it.

In Fig. 2, the letter D represents a shaft having several segmental cog-wheels, $g$, whose sections are arranged spirally around and upon it. E represents a shaft having a corresponding number of pinions, $h$, pulleys or fusees I, ratchets $j$, and cords $k$, for attaching thereto the springs $l$, which are reduced successively, as in the first part. F represents a pitman by which the first and second parts are connected, it being actuated by the wheel $m$, and actuating the wheel $n$, and thus communicating motion to the second part.

The operation of the device is as follows: When a given power is applied to the shaft A, in its revolutions the cams $a$ press down the levers $b$ one by one, successively reducing the springs $e$, the force of which is transmitted and secured to the shaft C by means of the pinions $d$ and ratchets $f$. The wheel $m$ on the shaft C actuates the pitman F, which, in turn, actuates the wheel $n$. The shaft D, having the segmental cogs $g$, winds up the springs $l$ on the drums or pulleys I, one by one, and the ratchets or pawls $j$ secure them to the shaft D, on which is the drive-wheel of a machine.

What I claim as new, and desire to secure by Letters Patent, is—

1. In a motor, the actuation of the shaft of a drive-wheel, C, by the joint action of springs $e$, which are successively reduced by means of levers $b$, substantially as described and shown.

2. In a motor, the combination of cams $a$ and levers $b$, terminating with segmental cogs $c$, for the successive reduction of springs $e$, substantially as set forth.

3. In a motor, the combination of a series of springs, $e$, and levers $b$ with a shaft, C, by means of pinions $d$ and ratchets $f$, and for the purposes aforesaid, substantially as shown.

4. In a motor, the combination of segmental cog-wheels $g$ with pinions $h$, ratchets $j$, and beveled drums or fusees I, for the successive reduction of springs $l$, for the purposes aforesaid, substantially as described.

5. In a motor, the accumulation of power by the combination of cams $a$, levers $b$, springs $e$, segmental cogs $c$, pinions $d$, and ratchets $f$, and the combination of the parts one and two, having the segmental cogs $g$, pinions $h$, fusees I, ratchets $j$, cords $k$, and springs $l$, substantially as set forth.

W. K. AZBILL.

Witnesses:
  H. B. CLUM,
  H. DINGMAN.